Feb. 4, 1964  F. P. KOKESH  3,120,122
METHODS AND APPARATUS FOR INVESTIGATING EARTH FORMATIONS
Filed Oct. 3, 1960
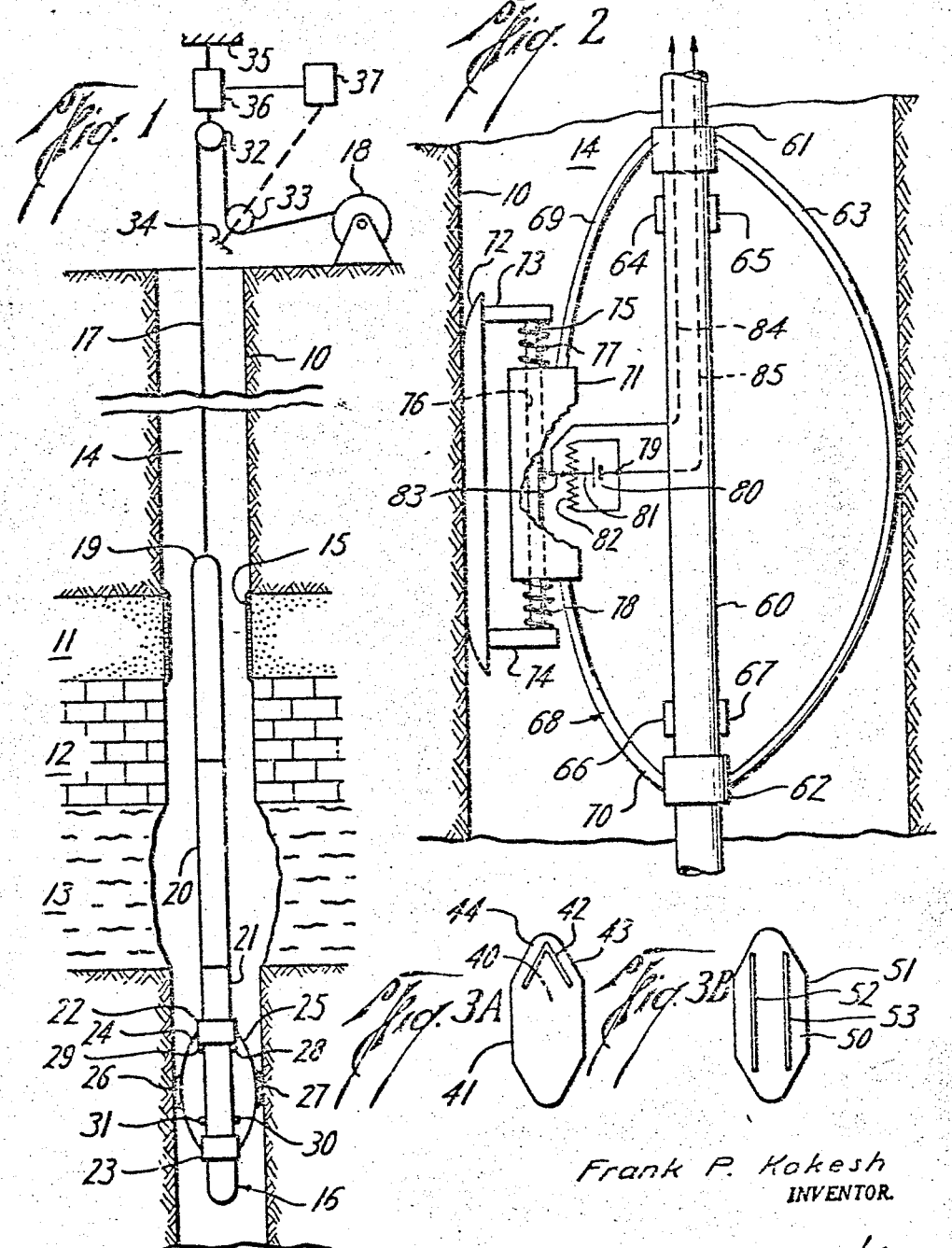
Frank P. Kokesh
INVENTOR.
BY William R. Sherman
ATTORNEY

United States Patent Office 3,120,122
Patented Feb. 4, 1964

---

3,120,122
METHODS AND APPARATUS FOR INVESTIGATING EARTH FORMATIONS
Frank P. Kokesh, Seabrook, Tex., assignor to Schlumberger Well Surveying Corporation, Houston, Tex., a corporation of Texas
Filed Oct. 3, 1960, Ser. No. 59,924
10 Claims. (Cl. 73—152)

This invention relates to the investigation of boreholes drilled through subterranean formations and, more particularly, to new and useful methods and apparatus for logging such boreholes to determine the presence of permeable formations.

Nearly all subsurface formations are porous to some degree and therefore capable of containing hydrocarbons. But, in order to extract the hydrocarbons, by conventional production methods, the formations must also be permeable. That is, the pore spaces containing the hydrocarbons must be connected to permit the fluids to flow through the formations. Hence, methods and apparatus for locating permeable zones are of primary interest to the oil industry. Several techniques are presently known and utilized. For example, the spontaneous potential log or the Microlog is often used with great accuracy to locate and define such zones. However, under certain drilling conditions, the SP or Microlog may not give usable indications of this important parameter. Such conditions might exist, for example, where the mud in the borehole is extremely salty or where the size of the borehole is large.

Furthermore, it is often desirable, from the standpoint of time or expense, to secure the maximum amount of information from the least possible number of trips or traverses of the borehole with logging instruments. It is not always possible, however, to record the SP or Microlog or other indicator of permeability simultaneously with other desired logs. For example, the acoustic velocity, or sonic, log is valuable for determining the porosity of the formations traversed but, as presently recorded and interpreted, it does not show which porous zones are permeable. Obviously, a simultaneously recorded indicator of permeability would be an extremely useful aid in the interpretation of the sonic log. But present limitations in logging techniques, for example, the limited number of electrical conductors in standard logging cables, render difficult the simultaneous recording of a Microlog and sonic log. And, though the SP may be recorded with the sonic log, it is not, as previously noted, always usable.

Accordingly, it is an object of the invention to provide new and improved methods and apparatus for locating permeable zones in boreholes under a variety of logging conditions.

Another object of the invention is to provide such methods and apparatus of sufficient simplicity that the methods may be readily practiced and the apparatus operated simultaneously with the recording of other borehole surveys.

These and other objects are attained, in accordance with the invention, by the method of measuring and obtaining indications of the frictional characteristics of the borehole wall opposite the various formations penetrated. In this method, the borehole is traversed by a suitable device suspended from a conventional logging cable and having a member in sliding contact with the borehole wall. The resistance to relative motion between the borehole wall and the sliding member is sensed and observed or recorded. Since the frictional resistance offered by the borehole wall modifies the tension in the supporting cable, the method may be practiced by sensing at the surface the variations in such cable tension.

In another aspect of the invention, apparatus is provided to practice the foregoing method. The apparatus comprises a flexible pad mounted on a support member and maintained in sliding contact with the borehole wall. The pad is resiliently mounted so as to be displaced vertically with respect to the support member in proportion to the amount of frictional force exerted. A suitable transducer converts the vertical displacement into an electrical signal for transmission to a surface recorder.

The organization and manner of operation of the invention may best be understood, and further objects and advantages will become apparent, from the following description taken in conjunction with the accompanying drawings in which:

FIG. 1 is a view, partly in vertical section, of a borehole and simple apparatus illustrating the method aspect of the invention;

FIG. 2 is a view showing the apparatus aspect of the invention in elevation and a borehole in vertical section;

FIGS. 3a and 3b are elevation views of the surface of wall-engaging pads which may be used with the apparatus of either FIG. 1 or FIG. 2.

In FIG. 1, there is shown a borehole 10 drilled through earth formations including a typical permeable formation 11, a typical hard impervious formation 12, and a typically caved shale formation 13. As is conventional in the art of well drilling, the borehole 10 is filled with drilling mud 14 conditioned so that the hydrostatic pressure exerted by the mud on the wall of the borehole exceeds the natural pressure of the fluids in the formations. As a result of this pressure differential, the mud will filter into the permeable formations, such as formation 11. In so doing, the solid particles associated with the drilling mud will be deposited on the exposed face of the permeable beds, forming a mud cake, as at 15, which tends to seal off the permeable beds and inhibit further liquid infiltration. The nature and composition of the mud cake depend primarily upon the nature of the mud rather than the formations and its thickness generally varies from ⅛″ to 1″. Thus, any wall-engaging member adapted to slide along the borehole wall will contact mud cake opposite the permeable zones but only the matrix of the formations opposite impermeable zones.

It has been discovered that the permeable and impermeable zones may be distinguished by moving such a wall-engaging member through the borehole while maintaining its sliding surface against the borehole wall with a substantially constant normal force and obtaining indications of the force of sliding friction between the member and the formations or mud cake contacted. A suitable wall-engaging member may be, for example, a pad with a pliable surface which conforms to the curvature of and slides along the borehole wall. The force of sliding friction upon the pad surface, for a given normal force, will depend upon the presence or absence of mud cake, the nature of the mud, and the nature of the formations.

For particular well conditions, the differences in magnitude of the indications obtained opposite permeable and impermeable zones may not be sufficient to permit satisfactory interpretation. For such cases, it has been further discovered that the differences may be increased by using special pads, as will be hereinafter described. Thus, regardless of well conditions, a qualitative friction log exhibiting a high degree of contrast between readings opposite permeable and impermeable zones may be obtained.

This method of logging boreholes to detect and locate permeable zones constitutes one aspect of the invention and a mode of practice is described in detail with further reference to FIG. 1 as follows.

Friction generating apparatus 16 is suspended from a conventional logging cable 17 and, by means of a conventional winch device 18, may be lowered and raised in borehole 10 in a well known manner. The apparatus 16 may be connected to and operated in conjunction with other borehole apparatus 19 and 20, which may be, for example, acoustic transducer housings. The apparatus 16 comprises an elongated mandrel 21, which may be merely a support or may be used to contain other borehole instruments. An upper collar 22 and lower collar 23 are slidably received over mandrel 21. At least two bowed spring arms 24 and 25 have their upper and lower ends attached to collars 22 and 23, respectively, and serve to bias centrally attached wall-engaging pads 26 and 27 transversely away from mandrel 21 and into contact with the wall of borehole 10. Upper stop lugs 28 and 29, attached to mandrel 21, limit downward movement of upper collar 22 relative to mandrel 21 during an upward traverse of borehole 10; while lower stop lugs 30 and 31, also attached to mandrel 21, similarly limit movement of lower collar 23 during descent into borehole 10. The biasing characteristics of spring arms 24 and 25 are such that the force with which pads 26 and 27 are applied to the wall of borehole 10 remains substantially constant over the working range of borehole diameters. Biasing mechanisms having such constant force characteristics over a wide range of borehole diameters are known in the well logging art. Further, it should be understood that the bowed-spring type of mechanism described above, and hereinafter with respect to FIG. 2, is only illustrative and other biasing means may be readily utilized. For example, hydraulically actuated mechanisms may be employed.

As the apparatus 16 travels upwardly through borehole 10, the force of kinetic sliding friction acting upon pads 26 and 27 will be reflected as tension in cable 17. At the surface cable 17 is passed over an upper sheave 32, thence vertically downward to a lower sheave 33, and then to power winch 18. The lower sheave 33 may be anchored to any convenient structure 34, such as the floor of a drilling rig; while the upper sheave 32 may be similarly anchored to structure 35, such as the traveling block of a drilling rig. Between the upper sheave 32 and its anchor 35 there is interposed a tension measuring device 36 of conventional design. The output signal of device 36 may be fed to a conventional recorder 37, which is driven in synchronization with the movement of cable 17, so as to log a continuous record of cable tension versus depth.

The total tension indicating signal of the device 36 will include several force components, including the weight of all the apparatus suspended from the cable (a constant component), the weight of the cable in the borehole (a steadily decreasing component when the borehole is logged from bottom to top), and the friction between the borehole wall and the pads (the only component of interest). The sensitivity of the device to variations in the latter component may be increased by cancelling or biasing out that portion of the signal representative of the apparatus and cable weight. Means for accomplishing this are well known to those skilled in the electrical arts and no attempt is here made to illustrate or claim them as part of this invention.

The preferred construction of wall-engaging pads 26 and 27 for use with the above-described apparatus may best be understood with reference to the general laws of kinetic sliding friction. These laws may be analytically expressed by the relation $$F = \mu N$$

wherein F is the force of kinetic sliding friction between two contacting surfaces, $\mu$ is the coefficient of sliding friction determined by the nature of the contacting surfaces, and N is the normal force pressing the surfaces together. Obviously, if the normal force remains constant, the force of friction depends only upon the nature of the contacting surfaces, and is independent of the contact area. Therefore, the contact area of the pads need only be sufficiently large to slide over the surfaces of the formations and mud cake without penetration. In order to assure this necessary minimum contact area for various borehole diameters, a flexible pad conformable to the curvature of the borehole wall is utilized.

As previously mentioned, special pads may be used to increase the contrast in the amount of friction over mud cake and impervious formations. Special pads which increase the force of friction over mud cake and decrease it over impervious formations are illustrated in FIGS. 3a and 3b. In FIG. 3a, the wall-engaging surface 40 of pad 41 has near its leading portion a V-shaped scraper 42. Scraper 42 may be constructed of thin metal bars imbedded in and projecting a short distance outward from pad surface 40, as shown, or the surface of the pad itself may be formed to create the scraping edge by recessing portions 43 and 44 of the pad surface. Pad 41 is constructed of a flexible material so that surface 40 will conform to the curvature of the borehole wall. Scraper 42 will merely slide over hard impervious formations; but, as pad 41 moves over the soft mud cake opposite a permeable formation, scraper 42 will plow away a portion of the sealing mud cake, thereby reopening the permeable formations to the high pressure of the mud column. Since the portions of pad surface 40 below scraper 42 conform tightly to the remaining mud cake, the pressure differential between the mud column and the formation is impressed upon the back of pad 41, thereby increasing the normal force between pad surface 40 and the mud cake. From the previously given expression relating the laws of friction, it will be apparent that this increase in normal force N results in a corresponding increase in the force of friction F.

FIG. 3b illustrates a further pad surface modification for enhancing the contrast in friction opposite permeable and impermeable zones. Pad 51 has thin parallel runners 52 and 53 imbedded longitudinally in its surface 50 and projecting a short distance outward therefrom. Runners 52 and 53 may be made of steel or any similar material with a finished, smooth surface so that the coefficient of friction between the runners and impermeable formation surfaces is smaller than the coefficient between pad surface 50 and the mud cake. Opposite hard impervious formations, only runners 52 and 53 are in contact with the formations and, since their coefficient of friction is relatively low, the force of friction will be correspondingly low for the given normal force. However, when pad 51 is moved over mud cake, the runners will cut into the soft surface and permit the mud cake and pad surface 50 to come in contact, thereby producing their relatively higher force of friction.

By combining the scraper of FIG. 3a with the runners of FIG. 3b, a pad giving extreme variations in frictional resistance over permeable and impermeable formations may be produced.

In the light of the foregoing teachings, it will be apparent that special pads could be constructed so as to accentuate the frictional contact in an opposite manner, that is, to increase the force of friction for impermeable borehole surfaces or to decrease it for mud-caked surfaces, or both. For example, the runners of the FIG. 3b pad could be serrated so as to give them a higher coefficient of friction with hard impermeable surfaces than with soft mud cake.

While the wall-engaging pads heretofore described will slide along most relatively even borehole surfaces impeded only by the force of friction, there may occasionally be encountered formations having highly uneven surfaces as, for example, the "caved" shale 13 illustrated in FIG. 1. When moving through such zones, the leading edges of the pads may catch or hang momentarily on sharp projections, thereby introducing vertical force components not attributable to sliding friction. Thus, force measurements comparable in magnitude to the mud cake friction forces may occur when the pads traverse such formations. However, the measurements thus obtained will be intermittent and erratic and easily distinguishable from the smooth, continuous measurements of mud-caked zones.

It is recognized that under certain conditions the above-disclosed apparatus may not obtain the results desired with sufficient accuracy. For example, in exceptionally deep or highly deviated boreholes the frictional component of cable tension may be attenuated in the exceptional cable length or the friction of the cable itself rubbing against the sides of curves in the borehole may obscure the friction signal from the apparatus.

Accordingly, in another aspect of the invention, there is provided apparatus for converting in the borehole the frictional force exerted on the wall-engaging pad or pads into an electrical signal for transmission to the surface.

In FIG. 2, such apparatus is illustrated positioned in an enlarged section of the borehole 10 of FIG. 1. In the general logging set-up shown in FIG. 1, the FIG. 2 apparatus would be connected in the position of apparatus 16 of FIG. 1 and could, of course, be operated in conjunction with other borehole apparatus as shown in FIG. 1. The tension measuring device 36 of FIG. 1 could, of course, be dispensed with when logging with the FIG. 2 apparatus.

Meanwhile now to FIG. 2, the apparatus comprises a mandrel 60, which may be merely a support or may serve to contain other borehole instruments, and a pair of collars 61 and 62 slidably received over mandrel 60. A bowed leaf spring 63 is attached at its ends to respective ones of collars 61 and 62. Upper stop members 64 and 65 limit downward movement of upper collar 61 relative to mandrel 60 during an upward traverse of the borehole. Lower stop members 66 and 67 similarly limit upward movement of lower collar 62 during a descent into the borehole. Outer leaf spring 63 is mounted a second bowed leaf spring assembly 68, which includes upper and lower leaf spring sections 69 and 70 attached at their upper and lower ends, respectively, to collars 61 and 62, and attached at their lower and upper ends, respectively, to a pad support member 71. Leaf spring assembly 68 cooperates with leaf spring 63 to urge pad support member 71 transversely away from mandrel 60 toward the wall of borehole 10 with a substantially constant force. Leaf spring 63 acts as a back-up spring and serves to maintain mandrel 60 in a relatively centralized position in the borehole 10.

A wall-engaging pad 72 is interposed between pad support member 71 and the wall of borehole 10 and connected to support member 71 by upper bracket 73 and lower bracket 74, which are jointed to opposite ends of rod 75. Rod 75 is slidably received in a bore 76 in support member 71 and is longer than bore 76 so that attached pad 72 may move longitudinally within fixed limits relative to support member 71. Upper coil spring 77 is received about the portion of rod 75 projecting above bore 76. The ends of coil spring 77 seat against upper bracket 73 and the top of support member 71. Lower coil spring 78 is similarly received about the portion of rod 75 projecting below bore 76 and has its ends similarly seated against the support member 71 and lower bracket 74. Coil springs 77 and 78 function to hold rod 75 and attached pad 72 at a centralized null position relative to support member 71 when no vertical external forces impinge upon pad 72 but permit restrained relative vertical movement of the rod 75 and attached pad 72 when such forces are applied. Another wall-engaging pad, similar to pad 72, may be rigidly attached centrally of leaf springs 63 in order to prevent tilting of the apparatus with respect to the axis of borehole 10.

The characteristics of coil springs 77 and 78 are chosen so that pad 72 is vertically displaced relative to support member 71 in an amount functionally related to the vertical component of the forces applied to pad 72. A potentiometer unit (illustrated schematically) is rigidly mounted within the body of support member 71 and comprises a battery 80 having one terminal 81 connected to the center of a resistor 82 and the other terminal 79 connected to both ends of resistor 82. A sliding potentiometer arm 83 is mechanically connected to and electrically insulated from rod 75, so that arm 83 moves relative to support member 71 and slides along resistor 82 in conjunction with movement of rod 75. The potentiometer unit and potentiometer arm 83 are electrically insulated from the drilling mud 14 in borehole 10. Insulated electrical conductors 84 and 85 are connected to potentiometer arm 83 and battery terminal 79, respectively, and then routed through mandrel 60 for transmission to a surface recorder (not shown) through conductors in a standard logging cable (not shown). Thus, the output signal across conductors 84 and 85 will be functionally related to the vertical deflection of pad 72 relative to support member 71 and, therefore, related to the force of friction exerted on pad 72 by the wall of borehole 10.

The previously-described special pads illustrated in FIGS. 3a and 3b may, of course, be used with the FIG. 2 apparatus in order to make the logs obtained more easily interpretable. For use with the FIG. 2 apparatus, it will be necessary to add an additional scraper to the lower end of the pad shown in FIG. 3a, since the FIG. 2 apparatus is adapted for logging while moving either upward or downward in the borehole.

Methods of mounting and insulating such mechanical-to-electrical transducers are well known to those skilled in the art of well logging. Such details of construction afford no serious problems, are not considered to be a material part of the invention, and have, therefore, been illustrated only schematically. It will be further apparent to those skilled in the art that many other transducer systems may be readily utilized to perform the function of the unit shown and that other changes, modifications and embodiments may be made without departing from the invention in its broader aspects. Accordingly, the invention is not to be limited, except as defined in the appended claims.

What is claimed is:

1. Borehole apparatus comprising: a support member adapted to be passed through a borehole; a wall-engaging pad member movably connected with said support member, said pad member having a flexible wall-engaging surface adapted to conform to the curvature of the borehole wall; means for urging said wall-engaging surface into contact with the borehole wall with a substantially constant force normal to the borehole wall; resilient means to permit restrained relative longitudinal movement between said pad member and said support member as said support member is moved through the borehole; and transducer means responsive to said relative longitudinal movement between said pad member and said support member.

2. Borehole apparatus comprising: an elongated support member adapted to be passed through a borehole; a wall-engaging member adapted to slide along the borehole wall; means for movably connecting said wall-engaging member to said support member including biasing means for urging said wall-engaging member laterally against the wall of the borehole and resilient means permitting restrained longitudinal movement of said wall-engaging member relative to said support member; and transducer means for developing a signal functionally related to the longitudinal displacement of said wall-engaging member relative to said support member.

3. Borehole apparatus comprising: an elongated support member adapted to be passed through a borehole; a wall-engaging member having a flexible wall-engaging surface adapted to conform to and slide along the borehole wall; means for movably connecting said wall-engaging member to said support member including biasing means for urging said wall-engaging member laterally against the wall of the borehole with a substantially constant force and resilient means permitting restrained longitudinal movement of said wall-engaging member relative to said support member; and transducer means connected to said wall-engaging member for developing a signal functionally related to the longitudinal displacement of said wall-engaging member relative to said support member.

4. Borehole apparatus comprising: an elongated support member adapted to be passed through a borehole; a wall-engaging member adapted to slide along the borehole wall; means for movably connecting said wall-engaging member to said support member including biasing means for urging said wall-engaging member laterally against the wall of the borehole and resilient means permitting restrained relative longitudinal movement between said wall-engaging member and said support member, the extent of said relative longitudinal movement being functionally related to the force of sliding friction between said support member and said wall-engaging member; and transducer means for developing a signal functionally related to said relative longitudinal displacement of said wall-engaging member relative to said support member.

5. The apparatus of claim 2 wherein said wall-engaging member is a flexible pad member having a surface curved to conform to the general curvature of the borehole wall and slide therealong, said pad member having a plurality of thin elongated runners projecting outwardly from the wall-engaging surface of said pad member, the coefficient of sliding friction between the wall-engaging surface of said pad member and the borehole wall being higher than the coefficient of sliding friction between said runners and the borehole wall.

6. The apparatus of claim 2 wherein said wall-engaging member is a flexible pad member having a surface curved to conform to the general curvature of the borehole wall and slide therealong, said surface having a leading portion adapted to scrape the borehole wall; and a plurality of thin elongated runners projecting outwardly from the wall-engaging surface of said pad member, the coefficient of sliding friction between the wall-engaging surface of said pad member and the borehole wall being higher than the coefficient of sliding friction between said runners and the borehole wall.

7. Borehole apparatus comprising: a support member adapted to be passed through a borehole; a friction pad member; means coupling said pad member to said support member for urging said pad member into contact with the borehole; means for permitting limited relative longitudinal movement between said pad member and said support member from a given position; and means for detecting the longitudinal displacement of said pad member relative to said support member from said given position where the displacement is due to friction between the borehole and pad member.

8. Borehole apparatus comprising: a support member adapted to be passed through a borehole; a friction pad member; means coupling said pad member to said support member for urging said pad member into contact with the borehole with a substantially constant force directed normal to the axis of the borehole; means for permitting limited relative longitudinal movement between said pad member and said support member from a given position; and means for detecting the longitudinal displacement of said pad member relative to said support member from said given position where the displacement is due to friction between the borehole and pad member.

9. The method of detecting permeable zones in earth formations traversed by a borehole comprising the steps of: suspending within the borehole a pad adapted for contact with the borehole, pressing the pad into contact with the side of the borehole with a substantially constant force, sliding the pad along the side of the borehole, and measuring the force required to overcome friction of the pad relative to the side of the borehole.

10. The method of detecting permeable zones in earth formations traversed by a borehole comprising the steps of: suspending within the borehole a pad adapted for contact with the borehole, pressing the pad into contact with the side of the borehole with a substantially constant force, sliding the pad along the side of the borehole detecting the force required to overcome friction of the pad relative to the side of the borehole, and recording the force required to overcome friction as a function of the depth of the pad within the borehole.

References Cited in the file of this patent
UNITED STATES PATENTS

| | | |
|---|---|---|
| 2,171,849 | Holt | Sept. 5, 1939 |
| 2,396,935 | Walstrom | Mar. 19, 1946 |
| 2,982,130 | McMahan | May 2, 1961 |